(12) United States Patent
Liu et al.

(10) Patent No.: US 11,164,326 B2
(45) Date of Patent: Nov. 2, 2021

(54) METHOD AND APPARATUS FOR CALCULATING DEPTH MAP

(71) Applicant: Samsung Electronics Co., Ltd., Suwon-si (KR)

(72) Inventors: Zhihua Liu, Beijing (CN); Yun-Tae Kim, Suwon-si (KR); Hyong Euk Lee, Suwon-si (KR); Lin Ma, Beijing (CN); Qiang Wang, Beijing (CN); Yamin Mao, Beijing (CN); Tianhao Gao, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/714,963

(22) Filed: Dec. 16, 2019

(65) Prior Publication Data

US 2020/0193623 A1 Jun. 18, 2020

(30) Foreign Application Priority Data

Dec. 18, 2018 (CN) .......................... 201811550318.1
Aug. 7, 2019 (KR) .......................... 10-2019-0096306

(51) Int. Cl.
*G06T 7/00* (2017.01)
*G06T 7/50* (2017.01)
(Continued)

(52) U.S. Cl.
CPC ................. *G06T 7/50* (2017.01); *G06N 3/04* (2013.01); *G06T 7/73* (2017.01);
(Continued)

(58) Field of Classification Search
CPC ... G06T 7/50; G06T 7/73; G06T 2207/10012; G06T 2207/20084; G06T 2207/30244;
(Continued)

(56) References Cited

U.S. PATENT DOCUMENTS 6,307,959 B1 10/2001 Mandelbaum et al.
6,556,704 B1 * 4/2003 Chen .................. G06K 9/20
382/154

(Continued)

FOREIGN PATENT DOCUMENTS

KR  10-1423139 B1  7/2014
KR  10-1752690 B1  7/2017
(Continued)

*Primary Examiner* — Ping Y Hsieh
(74) *Attorney, Agent, or Firm* — NSIP Law

(57) ABSTRACT

Disclosed is a depth map calculation method and apparatus. The depth map calculation method includes calculating a global sparse depth map corresponding to a current frame using frames including the current frame, calculating a local dense depth map corresponding to the current frame using the current frame, extracting a non-static object region from the current frame by masking a static object region, removing the non-static object region from the global sparse depth map, and generating a global dense depth map corresponding to the current frame by merging the non-static object region-removed global sparse depth map and the local dense depth map.

31 Claims, 14 Drawing Sheets

(51) Int. Cl.
*G06T 7/73* (2017.01)
*G06N 3/04* (2006.01)

(52) U.S. Cl.
CPC .............. *G06T 2207/10012* (2013.01); *G06T 2207/20084* (2013.01); *G06T 2207/30244* (2013.01)

(58) Field of Classification Search
CPC ........ G06N 3/04; G06N 3/0445; G06N 3/006; G06N 3/08; G06N 3/0454
See application file for complete search history.

(56) References Cited

U.S. PATENT DOCUMENTS

| | | | |
|---|---|---|---|
| 9,098,911 B2* | 8/2015 | Wu | H04N 13/261 |
| 9,286,810 B2 | 3/2016 | Eade et al. | |
| 9,524,434 B2 | 12/2016 | Gee et al. | |
| 9,878,447 B2 | 1/2018 | Thibodeau et al. | |
| 2014/0153784 A1* | 6/2014 | Gandolph | G06T 7/593 382/107 |
| 2014/0192158 A1* | 7/2014 | Whyte | G06T 7/593 348/46 |
| 2015/0086084 A1 | 3/2015 | Falconer et al. | |
| 2016/0026253 A1 | 1/2016 | Bradski et al. | |
| 2018/0075620 A1 | 3/2018 | Wang et al. | |
| 2018/0077534 A1 | 3/2018 | Le Grand et al. | |
| 2018/0137642 A1 | 5/2018 | Malisiewicz et al. | |
| 2018/0253107 A1 | 9/2018 | Heinla et al. | |
| 2019/0362511 A1* | 11/2019 | Jouppi | G06T 5/50 |
| 2020/0104034 A1* | 4/2020 | Lee | H04N 5/2258 |
| 2020/0349754 A1* | 11/2020 | Michielin | G06T 3/0093 |

FOREIGN PATENT DOCUMENTS

| | | |
|---|---|---|
| KR | 10-1853269 B1 | 6/2018 |
| KR | 10-2018-0096980 A | 8/2018 |
| WO | WO 2017/108413 A1 | 6/2017 |

* cited by examiner

METHOD AND APPARATUS FOR CALCULATING DEPTH MAP

CROSS-REFERENCE TO RELATED APPLICATIONS

This application claims the benefit under 35 USC § 119(a) of Chinese Patent Application No. 201811550318.1, filed on Dec. 18, 2018, in the Chinese Patent Office, and Korean Patent Application No. 10-2019-0096306 filed on Aug. 7, 2019 in the Korean Intellectual Property Office, the entire disclosures of which are incorporated herein by reference for all purposes.

BACKGROUND

1. Field

The following description relates to a method and apparatus for calculating a depth map.

2. Description of Related Art

Estimating a current location from a map while simultaneously constructing the map of an environment using sensor information is referred to as simultaneous localization and mapping (SLAM).

SLAM principally uses a light detection and ranging (LiDAR) and a camera as sensors to obtain the sensor information, for example, image data. When SLAM uses a camera, a required cost is lower, and it is applicable to a wider range (applicable in various weather conditions and circumstances) than when SLAM uses a LiDAR. However, SLAM using a camera exhibits a relatively low accuracy of pose determination and a constructed map, and thus, information related to unknown depth scenes may not be robust.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a depth map calculating method, including calculating a global sparse depth map corresponding to a current frame using frames including the current frame, calculating a local dense depth map corresponding to the current frame using the current frame, extracting a non-static object region from the current frame by masking a static object region, removing the non-static object region from the global sparse depth map, and generating a global dense depth map corresponding to the current frame by merging the non-static object region-removed global sparse depth map and the local dense depth map.

The calculating of the global sparse depth map may include calculating depth information corresponding to one or more pixel points in the current frame, estimating pose information of a camera corresponding to the current frame, and calculating three-dimensional (3D) coordinates of the one or more pixel points based on the depth information and the pose information of the camera.

The depth map calculating method may include updating pose information of a camera corresponding to the current frame based on the global dense depth map.

The depth map calculating method may include updating the global sparse depth map based on the updated pose information of the camera.

The calculating of the global sparse depth map may include calculating first depth information corresponding to a key frame of a timepoint previous to the current frame, from among the frames, calculating second depth information corresponding to the current frame, estimating pose information of a camera corresponding to the current frame based on the first depth information and the second depth information, and calculating the global sparse depth map based on the second depth information and the pose information of the camera.

The calculating of the second depth information may include performing stereo matching of a right image and a left image in the current frame.

The pose information of the camera may include any one or any combination one of rotation information and translation information changing, in response to the camera moving from a first location to a second location.

The calculating of the local dense depth map may include obtaining outputs of an artificial neural network corresponding to depth information of pixel points by inputting the current frame including the pixel points into the artificial neural network, and calculating the local dense depth map based on the outputs.

The extracting may include obtaining outputs of an artificial neural network classified into a static object region and a non-static object region by inputting the current frame into the artificial neural network, and extracting the non-static object region based on the outputs.

The generating may include dividing the local dense depth map into a grid of cells, updating depth information of pixel points corresponding to corner points of the grid cells based on the non-static object region-removed global sparse depth map, and updating depth information of pixel points in inner regions of the grid cells based on the non-static object region-removed global sparse depth map and the updated depth information of the pixel points corresponding to the corner points.

The calculating of the local dense depth map may include calculating a right feature map corresponding to a right image and a left feature map corresponding to a left image by inputting the right image and the left image in the current frame into a feature extractor, obtaining initial matching cost data of matching pixels between the left image and the right image based on the right feature map and the left feature map, predicting matching cost data by inputting the initial matching cost data into an artificial neural network, calculating respective depth information of the matching pixels based on the matching cost data, and calculating the local dense depth map based on the respective depth information.

The feature extracting module may include a left convolutional neural network (CNN) into which the left image is input and a right CNN into which the right image is input, and the left CNN and the right CNN share a weight.

The obtaining of the initial matching cost data may include obtaining the initial matching cost data by connecting the right feature map and the left feature map.

The predicting of the matching cost data may include predicting the matching cost data based on an hourglass artificial neural network and the initial matching cost data.

The calculating of the depth information may include performing a spatial convolution operation with respect to the matching cost data using a CNN, estimating a disparity of matching pixels between the left image and the right image based on a result of performing the spatial convolution operation, and calculating the depth information based on the disparity.

The performing of the spatial convolution operation may include obtaining matching cost layers by performing a division with respect to the matching cost data based on a direction set for the matching cost data, and performing a convolution operation sequentially with respect to the matching cost layers based on the direction.

The performing of the convolution operation sequentially may include performing the convolution operation after accumulating a convolution result of a matching cost layer previous to a matching cost layer, when performing the convolution operation with respect to the matching cost layer.

The estimating of the disparity of the matching pixels may include obtaining a disparity probability distribution of matching pixels between the left image and the right image based on the result of performing the spatial convolution operation and a softmax function, and estimating the disparity based on the disparity probability distribution.

The extracting may include calculating a feature map corresponding to the current frame by inputting the current frame into a feature extracting module, obtaining category attribute information of objects in the current frame based on the feature map, and obtaining state information of the objects included in the current frame based on the category attribute information.

The obtaining of the state information may include determining optical flow information between the current frame and a frame previous to the current frame, and obtaining the state information based on the optical flow information and the category attribute information.

In another general aspect, there is provided a depth map calculating apparatus, including a camera configured to acquire frames including a current frame, and a processor configured to calculate a global sparse depth map corresponding to the current frame using the frames, calculate a local dense depth map corresponding to the current frame using the current frame, extract a non-static object region from the current frame by masking a static object region, remove the non-static object region from the global sparse depth map, and generate a global dense depth map corresponding to the current frame by merging the non-static object region-removed global sparse depth map and the local dense depth map.

The processor may be configured to calculate depth information corresponding to one or more pixel points included in the current frame, and to calculate three-dimensional (3D) coordinates of the one or more pixel points based on the depth information.

The processor may be configured to update pose information of a camera corresponding to the current frame based on the global dense depth map.

The processor may be configured to update the global sparse depth map based on the updated pose information of the camera.

The processor may be configured to calculate first depth information corresponding to a key frame from among the frames, calculate second depth information corresponding to the current frame, estimate pose information of a camera corresponding to the current frame based on the first depth information and the second depth information, and calculate the global sparse depth map based on the second depth information and the pose information of the camera.

The processor may be configured to perform stereo matching of a right image and a left image in the current frame.

The processor may be configured to obtain outputs of an artificial neural network corresponding to depth information of pixel points by inputting the current frame including the pixel points into the artificial neural network, and to calculate the local dense depth map based on the outputs.

The processor may be configured to obtain outputs of an artificial neural network classified into a static object region and a non-static object region by inputting the current frame into the artificial neural network, and to extract the non-static object region based on the outputs.

The processor may be configured to divide the local dense depth map into a grid of cells, update depth information of pixel points corresponding to corner points of the grid cells based on the non-static object region-removed global sparse depth map, and update depth information of pixel points in inner regions of the grid cells based on the non-static object region-removed global sparse depth map and the updated depth information of the pixel points corresponding to the corner points.

The processor may be configured to calculate a right feature map corresponding to a right image and a left feature map corresponding to a left image by inputting the right image and the left image in the current frame into a feature extractor, obtain initial matching cost data of matching pixels between the left image and the right image based on the right feature map and the left feature map, predict matching cost data by inputting the initial matching cost data into an artificial neural network, calculate respective depth information of the matching pixels based on the matching cost data, and calculate the local dense depth map based on the respective depth information.

Other features and aspects will be apparent from the following detailed description, the drawings, and the claims.

Figure 1:
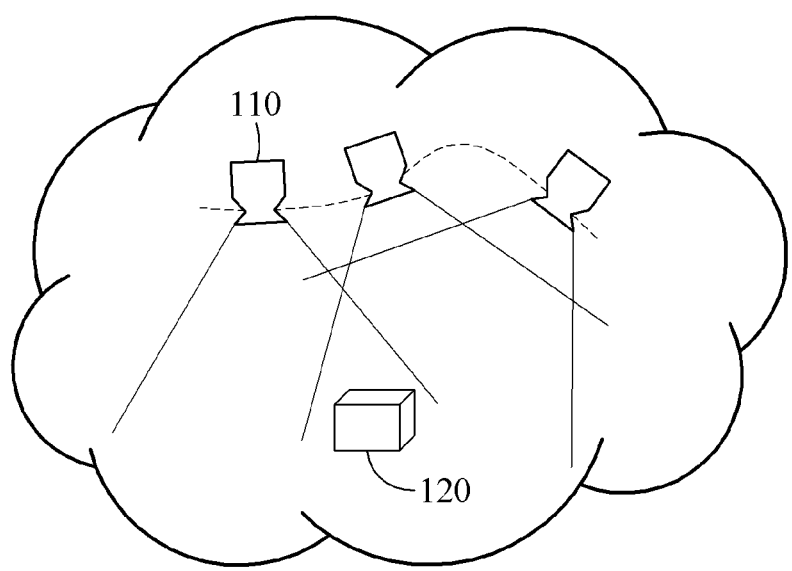
FIG. 1 illustrates an example of simultaneous localization and mapping (SLAM).

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, except for operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

It will be understood that when a component is referred to as being "connected to" another component, the component can be directly connected or coupled to the other component or intervening components may be present. When describing the examples with reference to the accompanying drawings, like reference numerals refer to like constituent elements and a repeated description related thereto will be omitted. In the description of examples, detailed description of well-known related structures or functions will be omitted when it is deemed that such description will cause ambiguous interpretation of the present disclosure.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

The apparatus and methods disclosed herein may be implemented in various electronic devices, such as, for example, a mobile telephone, a smartphone, a wearable smart device (such as, a ring, a watch, a pair of glasses, glasses-type device, a bracelet, an ankle bracket, a belt, a necklace, an earring, a headband, a helmet, a device embedded in the cloths, or an eye glass display (EGD)), a computing device, for example, a server, a laptop, a notebook, a subnotebook, a netbook, an ultra-mobile PC (UMPC), a tablet personal computer (tablet), a phablet, a mobile internet device (MID), a personal digital assistant (PDA), an enterprise digital assistant (EDA), an ultra mobile personal computer (UMPC), a portable lab-top PC, electronic product, for example, a robot, a digital camera, a digital video camera, a portable game console, an MP3 player, a portable/personal multimedia player (PMP), a handheld e-book, a global positioning system (GPS) navigation, a personal navigation device, portable navigation device (PND), a handheld game console, an e-book, a television (TV), a high definition television (HDTV), a smart TV, a smart appliance, a smart vacuum cleaner, a smart home device, or a security device for gate control, a walking assistance device, a kiosk, a robot, an indoor autonomous robot, an outdoor delivery robot, underwater and underground exploration robots, various Internet of Things (IoT) devices, an autonomous vehicle, an automatic or autonomous driving system, an intelligent vehicle, an unmanned aerial vehicle, an advanced driver assistance system (ADAS), a head-up display (HUD), and an augmented reality head-up display (AR HUD), or any other device capable of wireless communication or network communication consistent with that disclosed herein.

FIG. 1 illustrates an example of simultaneous localization and mapping (SLAM).

Referring to FIG. 1, according to SLAM, an apparatus for calculating a depth map, hereinafter, the "calculation apparatus", estimates a current location of the calculation apparatus from a map while simultaneously constructing the map of an environment using sensor information. The calculation apparatus calculates the location and obtains the map by combining the sensor information obtained from sensor(s). For example, when the calculation apparatus is a robot 110, it moves and recognizes spatial topography 120 of a periphery by utilizing a sensor provided in the robot 110, and estimates a relative location of the robot 110 while simultaneously generating a map of a neighboring environment using the obtained spatial topography 120.

SLAM is utilized for various robots such as an indoor autonomous robot, an outdoor delivery robot, an unmanned aerial vehicle, and underwater and underground exploration robots, and also for augmented reality (AR)/virtual reality (VR). Global positioning system (GPS) is widely used to obtain positional information outdoors. However, a low-end GPS provides a positioning accuracy at the few meters level, and the accuracy significantly drops when obstacles such as high-rise buildings or tunnels block the signals. For a successful autonomous operation of a robot even in such an environment, a sensor mounted on the robot needs to estimate a location at the few centimeters level by recognizing a neighboring environment. SLAM helps to construct a precise map for accurate localization.

sensors utilized for SLAM include sensors, such as, for example, a camera, a light detection and ranging (LiDAR), a gyro sensor, and an encoder. When a LiDAR is used, a relatively accurate, high-resolution depth map is calculated. However, when travelling in a large space (an airport, a shopping mall, or a huge hall) beyond the coverage of the sensor, in a space where there are a number of obstacles (glass or mirrors) not detectable by the LiDAR, or in an environment where people move a lot, it is difficult to recognize the space using the LiDAR, and the cost therefor is high.

SLAM using a camera is referred to as visual SLAM. Visual SLAM requires a lower cost and is applicable to a wider range (applicable in various weather conditions and circumstances) than when SLAM uses a LiDAR. However, visual SLAM exhibits a relatively low accuracy of pose determination and a constructed map, and thus may hardly provide necessary information related to unknown depth scenes.

The calculation apparatus disclosed herein generates a high-quality, high-reliability map by combining deep learning-based technology with visual SLAM while retaining the advantages of visual SLAM. Hereinafter, a depth map calculating method and an overall operation of a calculation apparatus will be described with reference to FIGS. 2 and 3, an example of calculating a global sparse depth map will be described with reference to FIGS. 4 through 6, an example of calculating a local dense depth map will be described with reference to FIGS. 7 through 9, an example of masking a static object will be described with reference to FIG. 10, an example of generating a global dense depth map will be described with reference to FIGS. 11 through 13, and a diagram of the calculation apparatus will be described with reference to FIG. 14.

Figure 2:
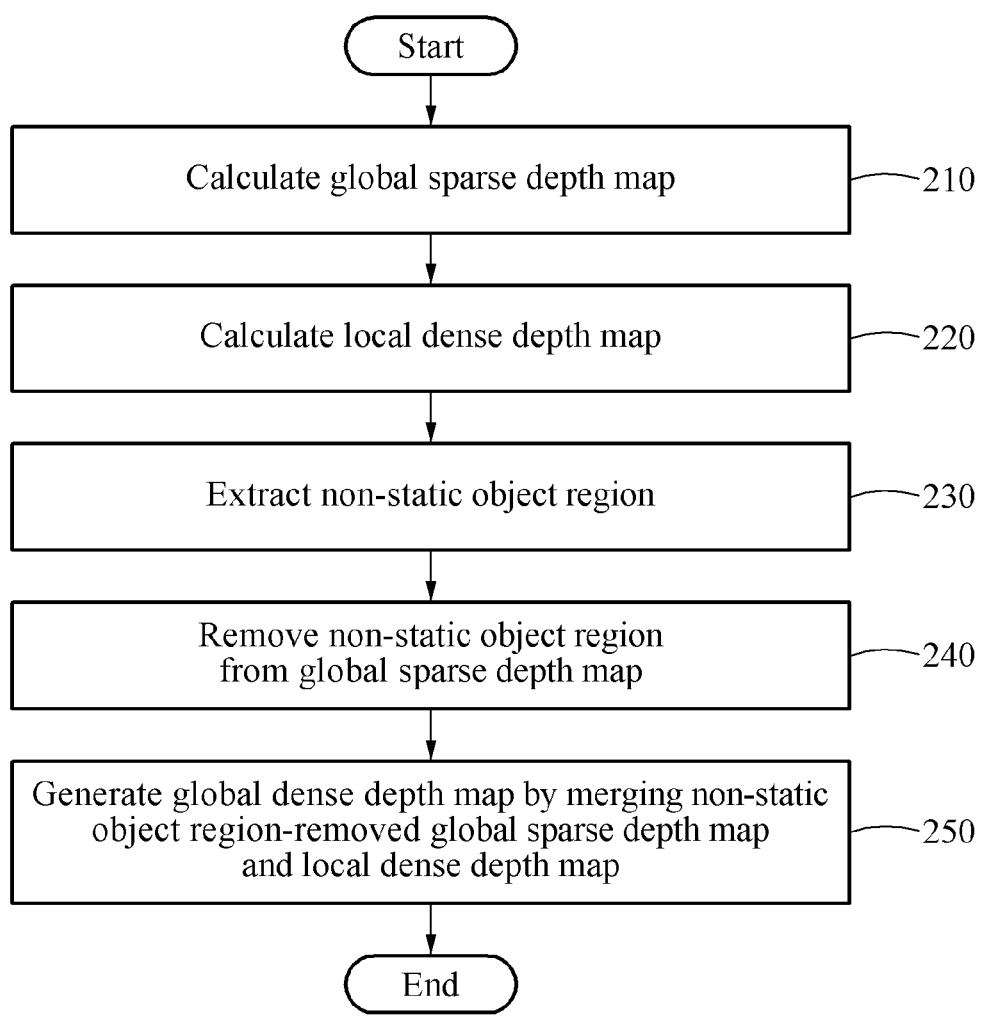
FIG. 2 illustrates an example of a depth map generating method.

FIG. 2 illustrates an example of a depth map generating method. The operations in FIG. 2 may be performed in the sequence and manner as shown, although the order of some operations may be changed or some of the operations omitted without departing from the spirit and scope of the illustrative examples described. Referring to FIG. 2, a depth map generating method is performed by the calculation apparatus described with reference to FIG. 1. Many of the operations shown in FIG. 2 may be performed in parallel or concurrently. One or more blocks of FIG. 2, and combinations of the blocks, can be implemented by special purpose hardware-based computer, and devices such as a processor, that perform the specified functions, or combinations of special purpose hardware and computer instructions. The calculation apparatus is implemented by one or more hardware modules. In addition to the description of FIG. 2 below, the descriptions of FIG. 1 is also applicable to FIG. 2 and are incorporated herein by reference. Thus, the above description may not be repeated here.

In operation 210, the calculation apparatus calculates a global sparse depth map corresponding to a current frame using a plurality of frames including the current frame. The calculation apparatus acquires an input image including the plurality of frames. A frame is a unit of an input image input into the calculation apparatus. A frame is a set of pixel points. A pixel point on a depth map will be referred to as a map point.

The input image is, for example, a live image or a moving picture. In an example, the input image is a mono image or a stereo image. The input image is captured through the camera included in the calculation apparatus, or acquired from the outside of the calculation apparatus.

The calculation apparatus traces pose information of the camera through matching of feature points of the plurality of frames included in the input image, and generates a depth map with respect to the feature points. A feature point refers to a pixel point having a representativeness of a frame.

The calculation apparatus calculates the global sparse depth map corresponding to the current frame. A depth map is an image representing a relative distance between pixels in a frame using a predetermined manner (for example, grayscale).

The global sparse depth map is a concept corresponding to a local dense depth map, which will be described later. In relation to the concepts of "global" and "local", a depth map including coordinate (hereinafter, referred to as "global coordinate") information in a three-dimensional (3D) space corresponding to a pixel point of a frame will be referred to as a "global depth map", and a depth map including only depth information simply corresponding to a pixel point will be referred to as a "local depth map".

In relation to the concepts of "sparse" and "dense", a depth map including depth information with respect to pixel points of higher proportion (for example, all pixel points included in a frame) will be referred to as a "dense depth map", and a depth map including depth information with respect to pixel points of a lower proportion will be referred to as a "sparse depth map". In summary, a global sparse depth map is a depth map including global coordinate information corresponding to pixel points of a lower proportion, and a local dense depth map is a depth map including only depth information corresponding to pixel points of the predetermined or higher proportion.

In an example, the calculation apparatus calculates depth information corresponding to the current frame, and estimates pose information of a camera corresponding to the current frame. Further, the calculation apparatus calculates the global sparse depth map by calculating 3D coordinates of pixel points based on the depth information and the pose information of the camera.

For example, the calculation apparatus acquires the input image using a stereo camera. In this example, a frame includes a left image corresponding to a left lens and a right image corresponding to a right lens. The calculation apparatus calculates the depth information corresponding to the current frame by geometric stereo matching of the left image and the right image. A method of geometric stereo matching will be described in detail with reference to FIG. 6.

When the depth information corresponding to the current frame is calculated, the calculation apparatus estimates the pose information of the camera corresponding to the current frame. The pose information of the camera includes at least one of rotation information and translation information that changes when the camera moves from a first location to a second location. For example, the pose information of the camera includes rotation information R and translation information T of the camera. In another example, the pose information of the camera is, for example, a six-degree of freedom (6DoF) camera pose including X (horizontal position), Y (vertical position), Z (depth) corresponding to a position of the camera and/or pitch, yaw, and roll corresponding to an orientation of the camera.

In an example, the calculation apparatus estimates the pose information including the translation information (for example, the position of the camera) and rotation information (for example, the orientation of the camera) of the camera used to capture the input image, based on a correlation between pixels in a series of successive frames.

The calculation apparatus calculates the 3D coordinates of the pixel points based on the depth information and the pose information of the camera. Global coordinates of a pixel point are determined based on a product of depth information corresponding to the pixel point and pose information of the camera corresponding to the pixel point. An example of calculating the global sparse depth map will be described with reference to FIGS. 4 through 6.

In operation 220, the calculation apparatus calculates a local dense depth map corresponding to the current frame using the current frame. As described above, the local dense depth map is a depth map including only depth information corresponding to pixel points of a higher proportion.

The calculation apparatus calculates a high-quality, high-accuracy local dense depth map in view of prior knowledge on an image such as semantic information and global contextual information. An example of calculating the local dense depth map will be described with reference to FIGS. 7 through 9.

The global sparse depth map includes only depth information with respect to fewer pixel points than the local dense depth map. However, since the depth information of the global sparse depth map is calculated based on a precise geometric relationship, the global sparse depth map includes more accurate depth information than the local dense depth map. Accordingly, the calculation apparatus merges the global sparse depth map and the local dense depth map, thereby having advantages of both the respective depth maps.

However, depth information calculated using visual SLAM has a lower accuracy than depth information calculated using a LiDAR. Due to the low accuracy of the depth information, the accuracy of the pose information of the camera estimated based on the depth information is also low. In detail, when depth information is to be calculated using visual SLAM, the depth information is calculated under the assumption that an object is static. Thus, when a pixel point is included in a non-static object, an accuracy of depth information corresponding to the pixel point is low.

To eliminate such an issue, in operation 230, the calculation apparatus extracts a non-static object region from the current frame by masking a static object region. Further, in operation 240, the calculation apparatus removes the non-static object region from the global sparse depth map.

In an example, the calculation apparatus distinguishes a non-static object and a static object in a frame using an artificial neural network, and extracts only the non-static object region by masking the static object region. Since an accuracy of depth information decreases when the depth information is calculated based on a pixel point included in a non-static object region, the calculation apparatus removes the non-static object region from the global sparse depth map. An example of masking the static object region will be described with reference to FIG. 10.

In operation 250, the calculation apparatus generates a global dense depth map corresponding to the current frame by merging the non-static object region-removed global sparse depth map and the local dense depth map.

The non-static object region-removed global sparse depth map includes high-accuracy depth information, but pixel points having depth information are extremely sparse. On contrary, the local dense depth map includes depth information of a number of pixel points, but an accuracy of the depth information is low. The calculation apparatus generates a global dense depth map including high-accuracy depth information of multiple pixel points by merging the non-static object region-removed global sparse depth map and the local dense depth map. An example of generating the global dense depth map will be described with reference to FIGS. 11 through 13.

Figure 3:
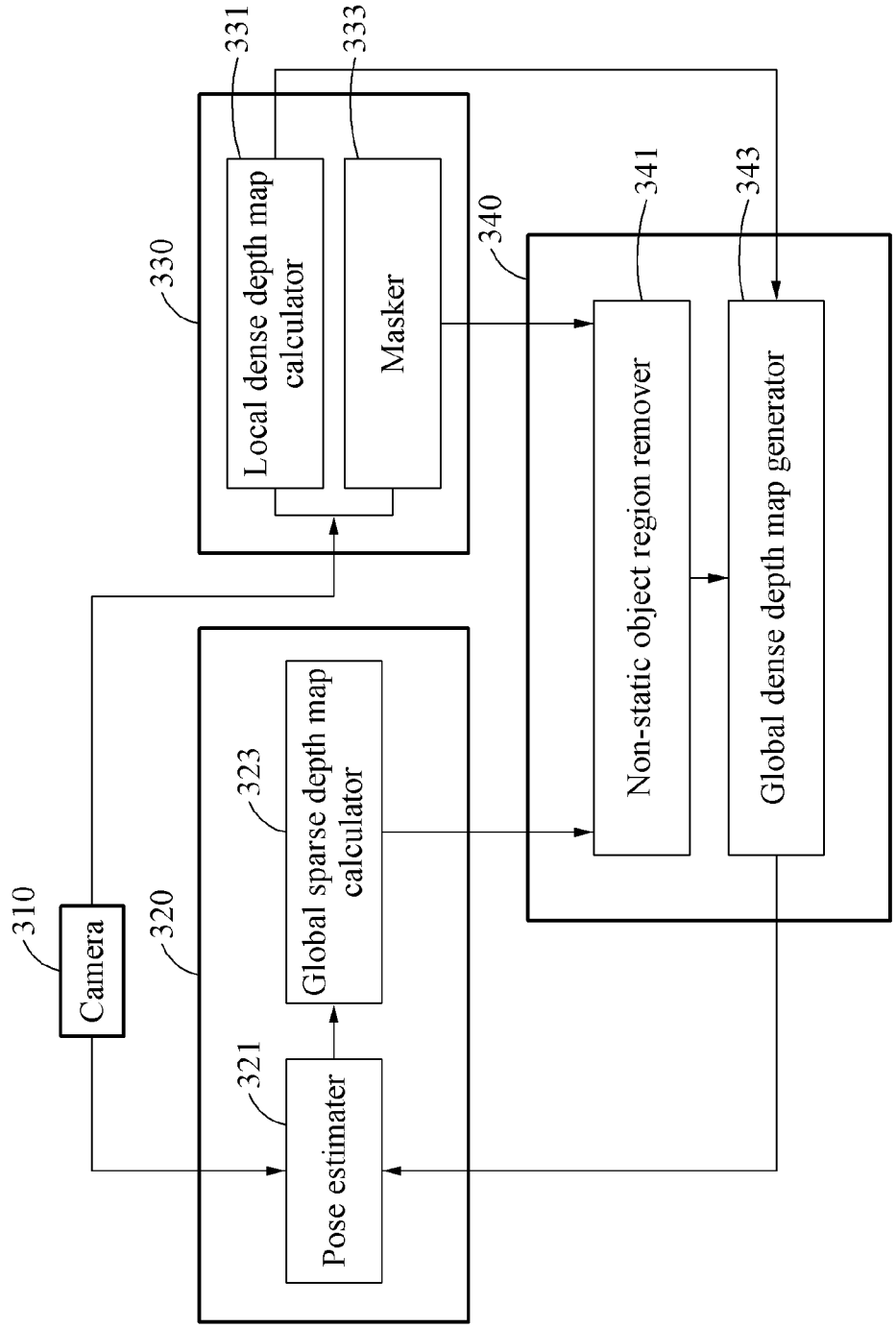
FIG. 3 illustrates an example of an operation of a calculation apparatus.

FIG. 3 illustrates an example of an operation of a calculation apparatus.

Referring to FIG. 3, a calculation apparatus includes a camera 310, an SLAM module 320, an artificial neural network module 330, and a depth map merger 340. In the example of FIG. 3, the elements are illustrated separately to describe the functions that are performed by these elements. production another example, the product may be configured such that all the functions may be processed by a processor or only a portion of the functions may be processed by the processor. One or more elements illustrated in FIG. 3, and combinations of these elements, can be implemented by special purpose hardware-based computer, and devices such as a processor, that perform the specified functions, or combinations of special purpose hardware and computer instructions.

In an example, the camera 310 is a stereo camera. An image captured by the camera 310 includes a plurality of frames. When the stereo camera is used, a left image corresponding to a left lens and a right image corresponding to a right lens are acquired.

The SLAM module 320 includes a pose estimator 321 configured to perform simultaneous localization and a global sparse depth map calculator 323 configured to perform mapping. The pose estimator 321 receives the plurality of frames acquired by the camera 310, and calculates depth information corresponding to a current frame by applying a geometric stereo matching to the plurality of frames. Further, the pose estimator 321 estimates pose information of the camera using a correlation between pixels in a series of successive frames.

The global sparse depth map calculator 323 calculates 3D coordinates of pixel points based on the depth information corresponding to the current frame and the pose information of the camera corresponding to the current frame received from the pose estimator 321.

The artificial neural network module 330 includes a local dense depth map calculator 331 and a masker 333. Unlike the pose estimator 321, the local dense depth map calculator 331 and the masking module 333 only need to receive the current frame, and do not need to receive frames other than the current frame. The local dense depth map calculator 331 receives the current frame and outputs depth information corresponding to a plurality of pixel points. For example, the local dense depth map calculator 331 performs stereo matching with respect to the received left image and right image in view of semantic information and global contextual information. The masking module 333 receives the current frame, and extracts a non-static object region from the current frame by masking a static object region.

The depth map merger 340 includes a non-static object region remover 341 and a global dense depth map generator 343. The non-static object region remover 341 removes the non-static object region from a global sparse depth map. The global dense depth map generator 343 generates a global dense depth map corresponding to the current frame by merging the non-static object region-removed global sparse depth map and a local dense depth map.

The pose estimator 321 and the local dense depth map calculator 331 perform stereo matching of the left image and the right image. Errors occur when stereo matching is performed. The errors are accumulated as an operation is performed, and thus there are errors between estimated values and actual values of the pose of the camera and the global dense depth map. To remove such errors and to obtain a more accurate result optimization is performed on the pose of the camera, the global sparse depth map, and the global dense depth map.

The optimization includes optimizing the pose of the camera based on the global dense depth map (hereinafter, referred to as pose optimization), optimizing the global sparse depth map based on the pose of the camera (hereinafter, referred to as sparse depth map optimization), and optimizing the global dense depth map based on the global sparse depth map (hereinafter, referred to as depth map merge optimization).

Map points of the global dense depth map are divided into two classes. A first map point is a map point coming from the global sparse depth map, and a second map point is a map point not positioned on the global sparse depth map but positioned on the local dense depth map.

The pose optimization refers to updating the pose information of the camera corresponding to the current frame based on the global dense depth map. The pose estimator 321 performs the pose optimization based on only the second map point in view of the optimization efficiency. That is, the pose estimator 321 performs the pose optimization using the map point positioned on only the local dense depth map.

The sparse depth map optimization refers to updating the global sparse depth map based on the optimized pose information. The global sparse depth map calculator 323 performs the sparse depth map optimization based on only the first map point in view of the optimization efficiency.

When the pose optimization and the sparse depth map optimization are completed, the global dense depth map generator 343 performs the depth map merge optimization. The depth map merge optimization refers to generating an updated global dense depth map using map merging, each time the pose optimization and the sparse depth map optimization are completed. The updated global dense depth map is used for the pose optimization again.

Figure 4:
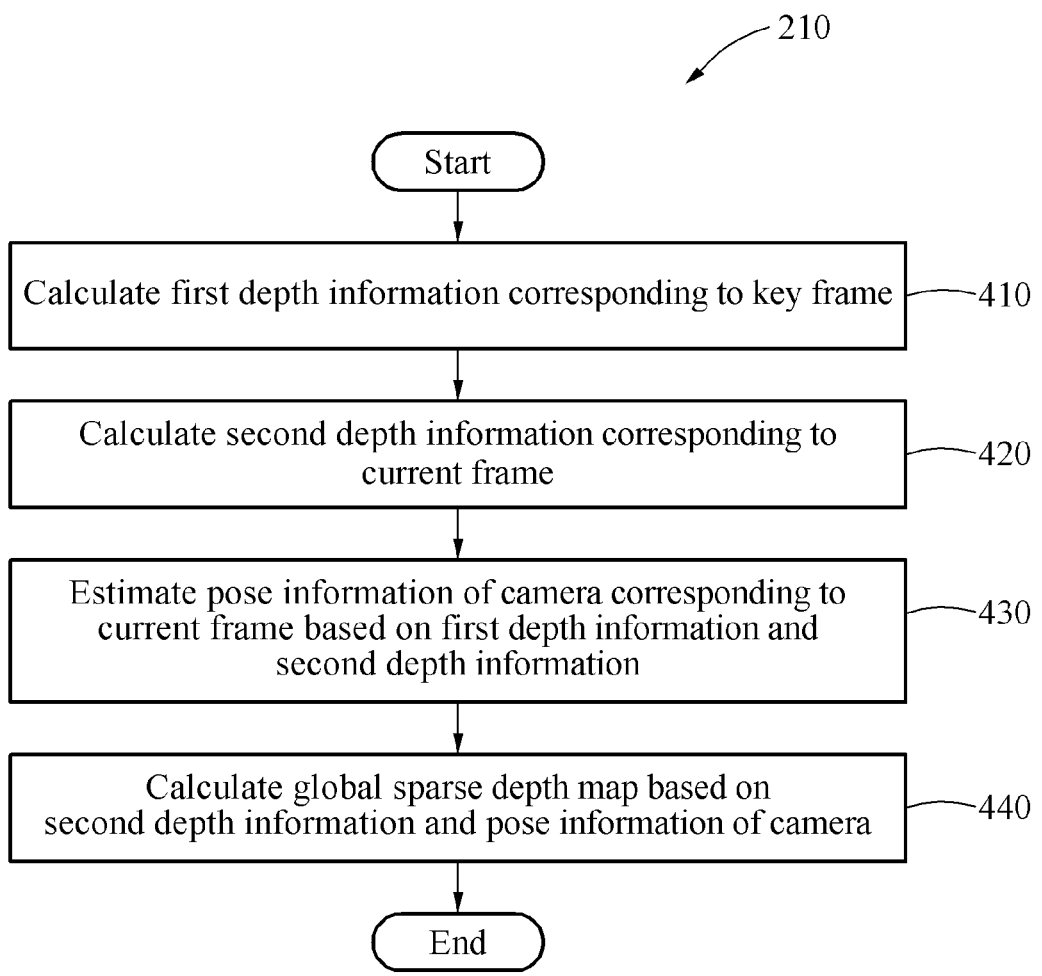
FIG. 4 illustrates an example of calculating a global sparse depth map.

FIG. 4 illustrates an example of calculating a global sparse depth map. The operations in FIG. 4 may be performed in the sequence and manner as shown, although the order of some operations may be changed or some of the operations omitted without departing from the spirit and scope of the illustrative examples described. Many of the operations shown in FIG. 4 may be performed in parallel or concurrently. One or more blocks of FIG. 4, and combinations of the blocks, can be implemented by special purpose hardware-based computer, and devices such as a processor, that perform the specified functions, or combinations of special purpose hardware and computer instructions.

Referring to FIG. 4, operations 410 through 440 may be performed by the calculation apparatus described with reference to FIGS. 1 through 3. In addition to the description of FIG. 4 below, the descriptions of FIGS. 1-3 is also applicable to FIG. 4 and are incorporated herein by reference. Thus, the above description may not be repeated here.

In operation 410, the calculation apparatus calculates first depth information corresponding to a key frame of a timepoint previous to a current frame, from among a plurality of frames. The calculation apparatus calculates the first depth information by performing stereo matching with respect to the key frame based on multi-view geometry. The first depth information includes depth information corresponding to a feature point included in the key frame.

When camera pose information estimation (feature point matching) and depth map calculation (or update) are performed with respect to all image frames, a processing rate is low, and it is difficult to use a precise algorithm due to the low processing rate. Thus, the calculation apparatus calculates a depth map only at a time interval or for a scene with a great change, and stores only a change in information with respect to a scene therebetween. In this example, a frame which is a basis of the depth map calculation is referred to as a key frame. In an example, key frames are disposed at an interval of about 2 seconds. Frames not selected as key frames are referred to as general frames to distinguish those frames from the key frames.

In an example only key frames satisfying the following three conditions are newly added to the depth map. (i) The quality of camera pose information estimated from a key frame should be good. For example, when a proportion of matching feature points is greater than or equal to a threshold, the quality of the estimated camera pose information is determined to be good. (ii) A frame should have a time difference from a last key frame added to the depth map. For example, for a frame to be selected as a key frame, the frame should have a time difference of at least 20 frames from a last key frame added to the depth map. (iii) A shortest distance from a camera and the existing depth map should be less than or equal to a threshold. The condition (iii) is to prevent the existing map from being distorted when an image captured at a viewpoint overly far from the existing depth map is added to the depth map. The example of selecting a key frame is are non-limiting examples, other methods of selecting a key frame may be used without departing from the spirit and scope of the illustrative examples described.

In operation 420, the calculation apparatus calculates second depth information corresponding to the current frame. The second depth information includes depth information corresponding to feature points included in the current frame. An example of performing stereo matching based on multi-view geometry will be described in detail with reference to FIG. 6.

In operation 430, the calculation apparatus estimates pose information of a camera corresponding to the current frame based on the first depth information and the second depth information. The calculation apparatus matches a feature point of the current frame and a feature point of the key frame when the current frame is acquired. For example, a sum of squared differences (SSD) between 8×8 image patches is used as a matching similarity. When the matching is completed, the pose of the camera is determined to minimize a reprojection error with respect to found matching pairs. The reprojection error refers to an error between a position in the current frame to which the feature point of the matching key frame is projected and a position actually observed in the current frame. However, the example of estimating the pose of the camera is not limited thereto. Various estimation methods may be used without departing from the spirit and scope of the illustrative examples described.

In operation 440, the calculation apparatus calculates a global sparse depth map based on the second depth information and the pose information of the camera. The calculation apparatus calculates global coordinates corresponding to the current frame based on the second depth information and the pose information of the camera, and the global coordinates are added to the global sparse depth map.

Figure 5:
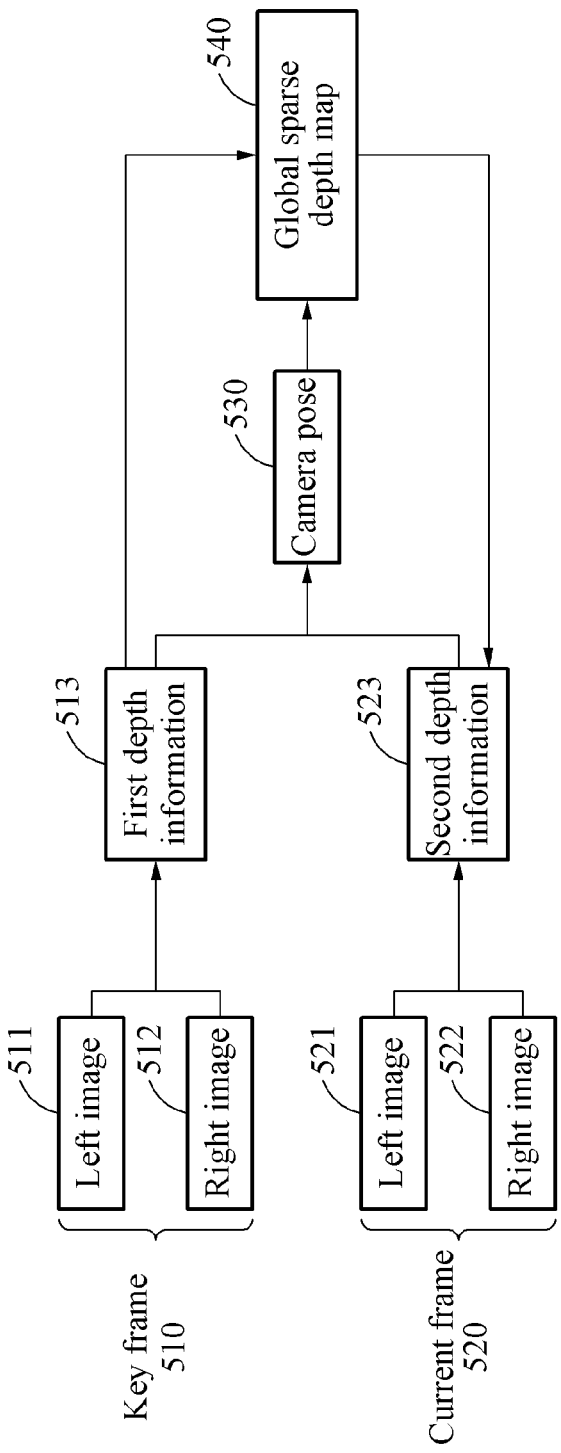
FIG. 5 illustrates an example of calculating a global sparse depth map.

FIG. 5 illustrates an example of calculating a global sparse depth map.

Referring to FIG. 5, a process of calculating a global sparse depth map includes an operation of estimating pose information of a camera and an operation of calculating a global sparse depth map. A calculation apparatus pursues real-time processing by applying the operation of estimating pose information of a camera which requires a relatively small operation load to all frames, and pursues an accuracy using a precise algorithm by applying the depth map calculating operation only to a key frame although it takes relatively long.

The calculation apparatus calculates first depth information 513 corresponding to a key frame 510 of a timepoint previous to a current frame 520, among a plurality of frames. The calculation apparatus acquires an input image using a stereo camera. In this example, the key frame 510 includes a left image 511 corresponding to a left lens and a right image 512 corresponding to a right lens. The calculation apparatus calculates the first depth information 513 corresponding to the key frame 510 by geometric stereo matching of the left image 511 and the right image 512.

The calculation apparatus calculates the first depth information 513 corresponding to the current frame 520. When the current frame 520 is a general frame, the calculation apparatus estimates only pose information of the camera corresponding to the current frame 520. In an example, when the current frame 520 is a key frame, the calculation apparatus calculates the pose information of the camera corresponding to the current frame 520 and a global sparse depth map.

The calculation apparatus acquires an input image using the stereo camera. In this example, the current frame 520 includes a left image 521 corresponding to the left lens and a right image 522 corresponding to the right lens. The calculation apparatus calculates second depth information 523 corresponding to the current frame 520 by geometric stereo matching the left image 521 and the right image 522.

The calculation apparatus estimates pose information 530 of the camera corresponding to the current frame 520 based on the first depth information 513 corresponding to the key frame 510 and the second depth information 523 corresponding to the current frame 520.

The calculation apparatus calculates a global sparse depth map 540 based on the second depth information 523 and the pose information 530 of the camera. When the 012052.1772 current frame 520 is a key frame, the calculation apparatus calculates global coordinates corresponding to the current frame 520 based on the second depth information 523 and the pose information 530 of the camera, and the global coordinates are added to the global sparse depth map 540.

Figure 6:
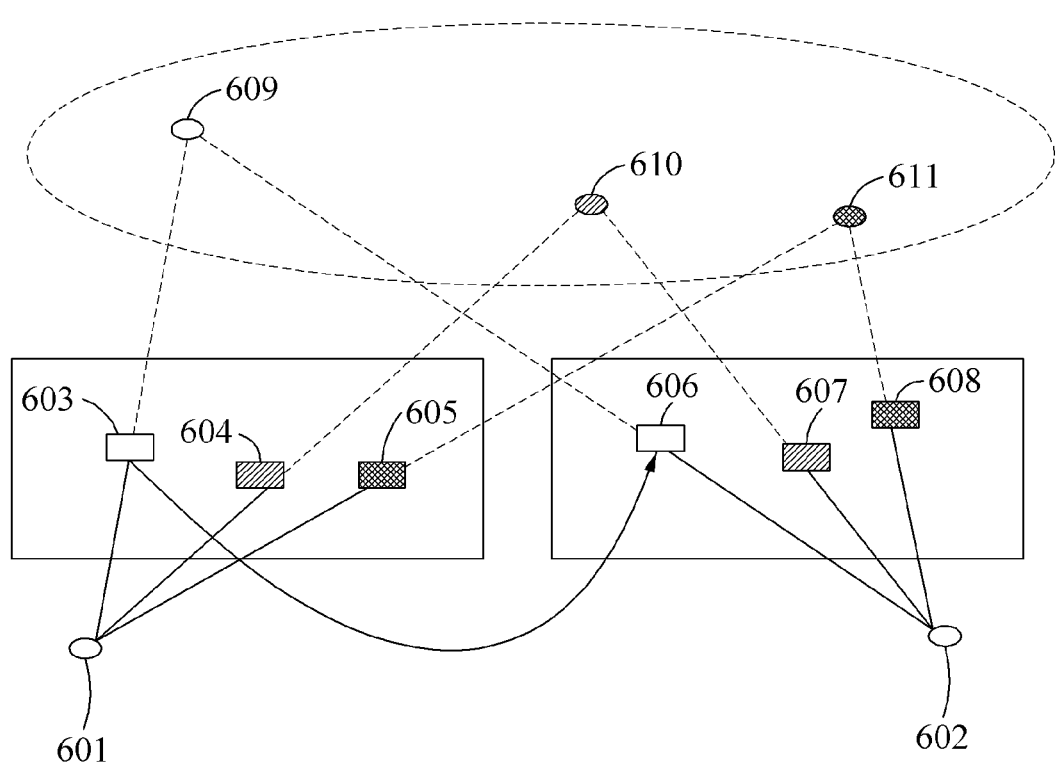
FIG. 6 illustrates an example of a geometric stereo matching.

FIG. 6 illustrates an example of a geometric stereo matching.

Referring to FIG. 6, a calculation apparatus calculates depth information corresponding to pixel points of a frame based on geometric stereo matching.

In an example, the camera is a stereo camera. The stereo camera includes a left lens 601 and a right lens 602. The left lens 601 is used to capture a left image, and the right lens 602 is used to capture a right image. A frame includes the left image and the right image.

The left image includes a pixel point 603, a pixel point 604 and a pixel point 605. The right image includes a pixel point 606, a pixel point 607 and a pixel point 608. The pixel point 603 of the left image corresponds to the pixel point 606 of the right image, and the pixel point 603 and the pixel point 606 are matched to a map point 609. The pixel point 604 of the left image corresponds to the pixel point 607 of the right image, and the pixel point 604 and the pixel point 607 are matched to a map point 610. Similarly, the pixel point 605 of the left image corresponds to the pixel point 608 of the right image, and the pixel point 605 and the pixel point 608 are matched to a map point 611. A pair of pixel points of the left image and the right image corresponding to the same point are referred to as matching pixel points.

The left lens 601 and the right lens 602 are at fixed positions, and a distance between the left lens 601 and the right lens 602, a distance between the left lens 601 and the left image, and a distance between the right lens 602 and the right image are known.

Based on the already known distance information, depth information of a map point is calculated. In detail, by extending a connection line of the left lens 601 and the pixel point 603, and extending a connection line of the right lens 602 and the pixel point 606, the map point 609 is obtained. Similarly, the map point 610 and the map point 611 are obtained. The map point 609, the map point 610 and the map point 611 are positioned on a global sparse depth map.

Figure 7:
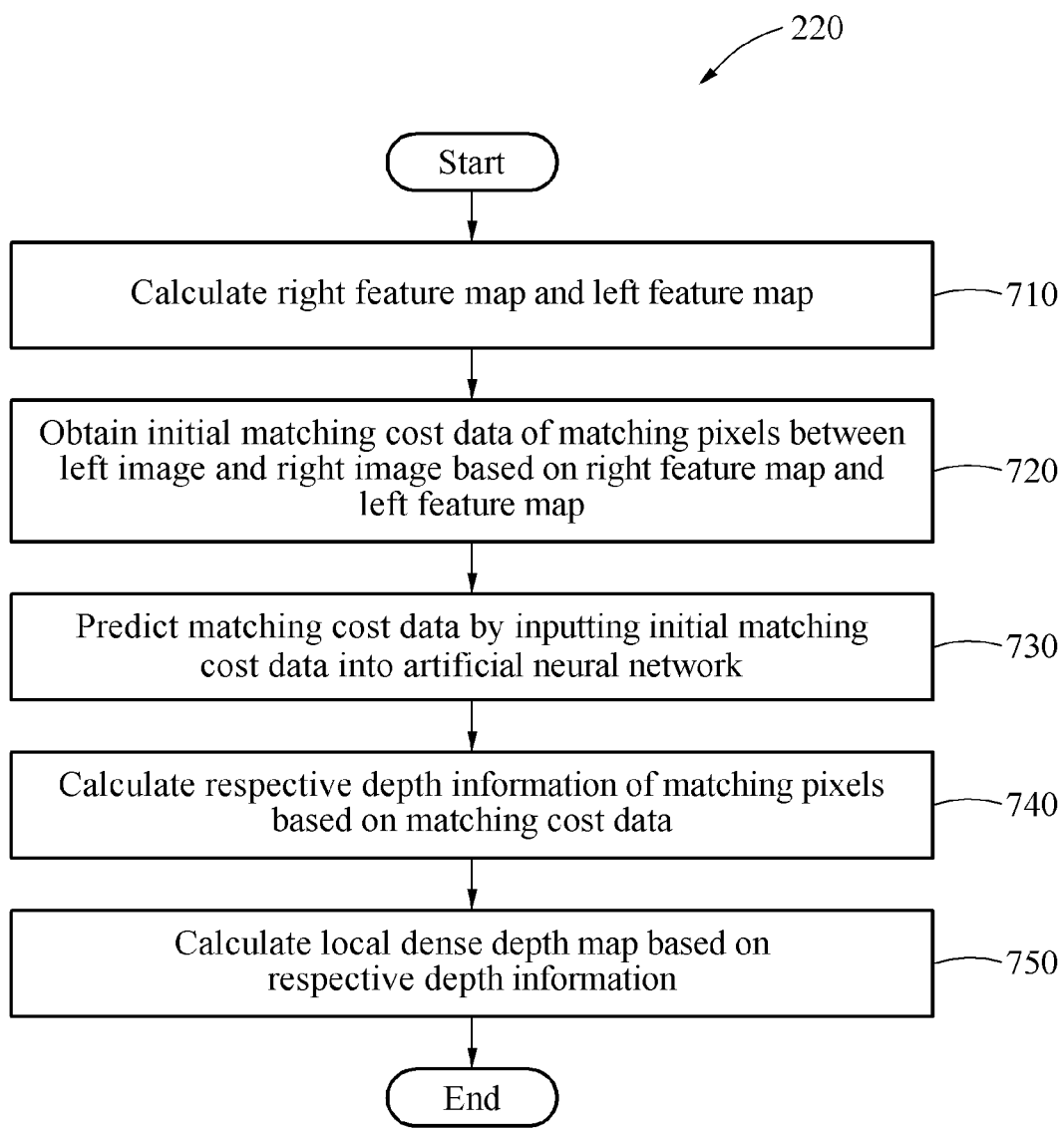
FIGS. 7 and 8 illustrate examples of calculating a local dense depth map.
Figure 8:
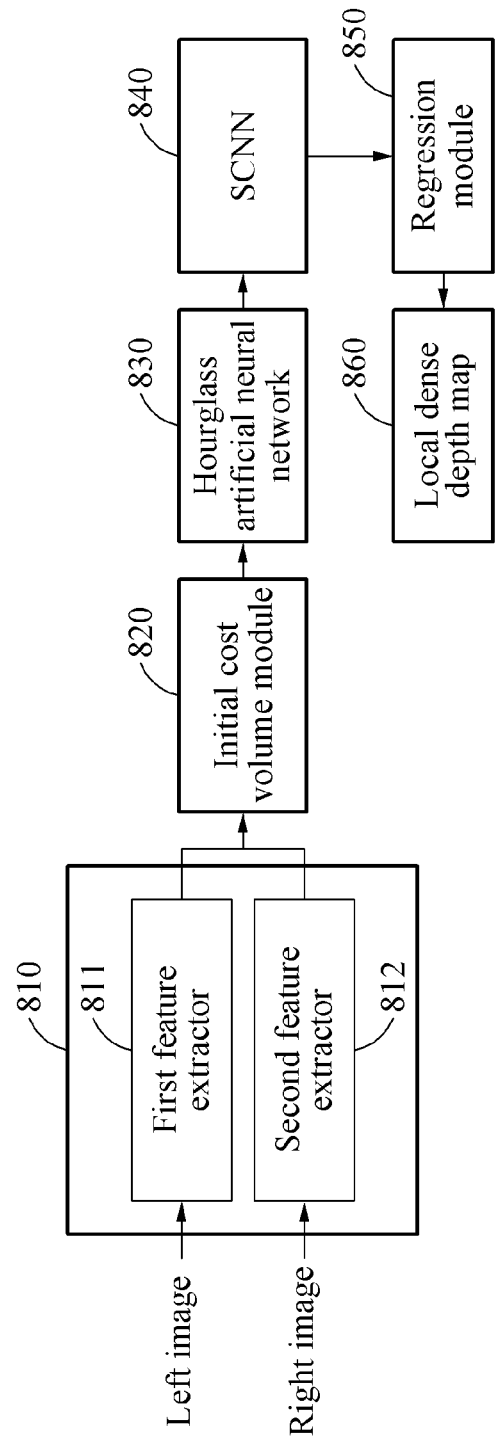

FIGS. 7 and 8 illustrate an example of calculating a local dense depth map. The operations in FIG. 7 may be performed in the sequence and manner as shown, although the order of some operations may be changed or some of the operations omitted without departing from the spirit and scope of the illustrative examples described. Many of the operations shown in FIG. 7 may be performed in parallel or concurrently. One or more blocks of FIG. 7, and combinations of the blocks, can be implemented by special purpose hardware-based computer, and devices such as a processor, that perform the specified functions, or combinations of special purpose hardware and computer instructions.

Referring to FIG. 7, operations 710 through 750 are performed by the calculation apparatus described with reference to FIGS. 1 through 3. In addition to the description of FIG. 7 below, the descriptions of FIGS. 1-6 is also applicable to FIG. 7 and are incorporated herein by reference. Thus, the above description may not be repeated here.

In operation 710, the calculation apparatus calculates a right feature map corresponding to a right image and a left feature map corresponding to a left image by inputting the right image and the left image included in a current frame into a feature extracting module.

Referring to FIG. 8, a feature extractor 810 includes a first feature extractor 811 into which the left image is input, and a second feature extractor 812 into which the right image is input. In an example, the first feature extractor 811 is a left convolutional neural network (CNN), and the second feature extractor 812 is a right CNN. In an example, the left CNN and the right CNN share a weight.

The first feature extractor 811 and the second feature extractor 812 include an artificial neural network including a two-dimensional CNN and a pretrained spatial pyramid pooling network. In an example, the left CNN and the right CNN may be a deep neural network (DNN). In an example, the DNN may include a region proposal network (RPN), a classification network, a reinforcement learning network, a fully-connected network (FCN), a deep convolutional network (DCN), a long-short term memory (LSTM) network, and a grated recurrent units (GRUs). The DNN may include a plurality of layers. The CNN includes a plurality of layers, each including a plurality of nodes. Also, the CNN includes connection weights that connect the plurality of nodes included in each of the plurality of layers to a node included in another layer.

In an example, the left CNN and the right CNN may receive the left image and the right image, respectively. In such an example, a convolution operation is performed on the left image and the right image with a kernel, and as a result, the feature maps are output. The convolution operation is performed again on the output feature maps as input feature maps, with a kernel, and new feature maps are output. When the convolution operation is repeatedly performed as such, a recognition result with respect to features of the left image and the right image may be finally output through the output layer of the CNN.

Referring to FIG. 7, in operation 720, the calculation apparatus obtains initial matching cost data of matching pixels between the left image and the right image based on the right feature map and the left feature map. The matching cost data is also referred to as a matching cost body or a matching cost matrix.

Referring to FIG. 8, the calculation apparatus obtains the initial matching cost data by connecting the right feature map and the left feature map using an initial cost volume module 820. For example, it is assumed that dimensions of the left and right feature maps are m*n*c (m, n and c being natural numbers). If a disparity is "0", a matrix of the size of m*n*2c is obtained by directly connecting the left and right feature maps. If the disparity is "d" (d being a natural number), d matrices of the size of m*n*2c are obtained by connecting the left feature map and the right feature map after parallelly translating the feature map d columns in a x-axial direction.

Referring to FIG. 7, in operation 730, the calculation apparatus predicts matching cost data by inputting the initial matching cost data into an artificial neural network.

Referring to FIG. 8, the calculation apparatus predicts the matching cost data by receiving the initial matching cost data using an hourglass artificial neural network 830.

Referring to FIG. 7, in operation 740, the calculation apparatus calculates respective depth information of the matching pixels based on the matching cost data.

Referring to FIG. 8, the calculation apparatus obtains the matching cost data by performing a spatial convolution operation with respect to the matching cost data using a spatial convolution neural network (SCNN) 840.

The calculation apparatus performs the spatial convolution operation with respect to the matching cost data using a CNN, for example, the SCNN 840, to prevent a remarkable change in disparity between neighboring pixel points. Through this, the calculation apparatus increases a spatial consistency with respect to the disparity of the neighboring pixel points, and removes a series of noise points. An example of performing the spatial convolution operation will be described in detail with reference to FIG. 9.

The calculation apparatus obtains a possible disparity value and a probability distribution corresponding to each pair of matching pixel points by calculating matching cost data using a regression module 850 based on a regression function including a transfer function (for example, a softmax function) with the greatest flexibility.

The calculation apparatus calculates depth information corresponding to the pixel points based on the possible disparity value and the probability distribution corresponding to each pair of the pixel points. In detail, the calculation apparatus calculates the disparity based on calculating a cumulative value (for example, an expected value) with respect to each pair of the matching pixel points. For example, the calculation apparatus obtains the disparity corresponding to the matching pixel points by multiplying candidate disparities of the matching pixel points and probabilities corresponding to the candidate disparities and adding up the respective products.

The calculation apparatus calculates a local dense depth map 860 based on the depth information of the matching pixel points.

Figure 9:
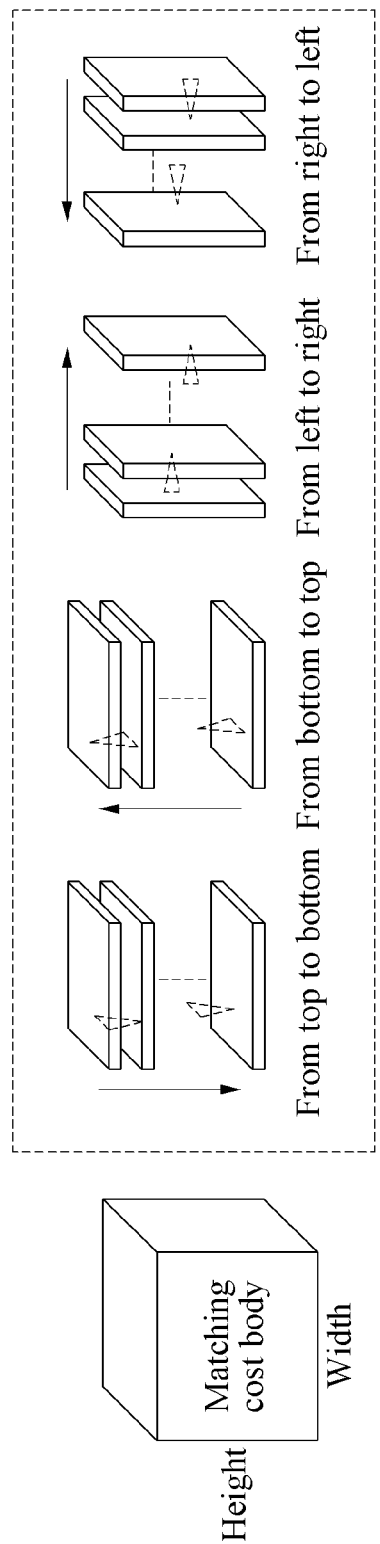
FIG. 9 illustrates an example of performing a spatial convolution operation.

FIG. 9 illustrates an example of performing a spatial convolution operation.

Referring to FIG. 9, a calculation apparatus obtains a plurality of matching cost layers by dividing the matching cost data based on a direction set for the matching cost data, and performing a convolution operation sequentially with respect to the plurality of matching cost layers based on the direction. The calculation apparatus performs the convolution operation after accumulating a convolution result of a matching cost layer previous to a predetermined matching cost layer, when performing the convolution operation with respect to the predetermined matching cost layer.

For example, the calculation apparatus divides the matching cost data into a plurality of first matching cost layers arranged sequentially based on a first direction (for example, in a direction from top to bottom) parallel to a height direction of the matching cost data, using a plurality of first planes perpendicular to the height direction.

Referring to Equation 1, the calculation apparatus performs an update with respect to each first matching cost layer from a second first matching cost layer based on the first direction using a convolution kernel.

$$X'_{k,i,j} = \begin{cases} X_{k,i,j} & i = 1 \\ X_{k,i,j} + conv(X'_{k,i-1,j}, K) & i > 1 \end{cases} \quad \text{[Equation 1]}$$

In Equation 1, i, j, and k denote the height, the width, and the feature channel of the matching cost data. K denotes a convolution function. X denotes a matching cost layer, and X' denotes an updated matching cost layer.

The updated value of the first matching cost layer is a sum of a current value of the first matching cost layer and a convoluted value of a matching cost layer previous to the first matching cost layer.

The calculation apparatus divides first convolution matching cost data into a plurality of second matching cost layers arranged sequentially based on a second direction (for example, in a direction from bottom to top) opposed to the first direction, and performs the convolution operation with respect to the second matching cost layers based on Equation 1.

Further, the calculation apparatus divides second convolution matching cost data into a plurality of third matching cost layers arranged sequentially based on a third direction (for example, in a direction from left to right) perpendicular to a second plane using a plurality of second planes perpendicular to the length direction or the width direction of the matching cost data, and performs the convolution operation with respect to the third matching cost layers based on Equation 1.

Further, the calculation apparatus divides third convolution matching cost data into a plurality of fourth matching cost layers arranged sequentially in a fourth direction (for example, in a direction from right to left) opposed to the third direction, and performs the convolution operation with respect to the fourth matching cost layers based on Equation 1.

The calculation apparatus performs spatial filtering (that is, matching cost accumulation) in two dimensions, in detail, the height and the width (or length) of the matching cost data. In an example, the spatial filtering is divided into four processes performed based on a total of four directions, from top to bottom, from bottom to top, from left to right, and from right to left. Calculating methods of the four processes are similar.

The calculation apparatus performs both the process performed from top to bottom and the process performed from bottom to top (or performs both the process performed from left to right and the process performed from right to left) to equalize costs corresponding to the directions. The calculation apparatus performs an update with respect to the matching cost layers, thereby increasing the consistency of matching costs corresponding to the directions.

In general, an end-to-end training method is used to predict depth information of pixel points. When a boundary line of an object is processed using the existing method, rather than performing the spatial convolution operation (spatial filtering), the boundary line is disconnected. However, when the spatial convolution operation is performed, a decrease in the matching cost data or a disconnection of the boundary line does not occur.

Figure 10:
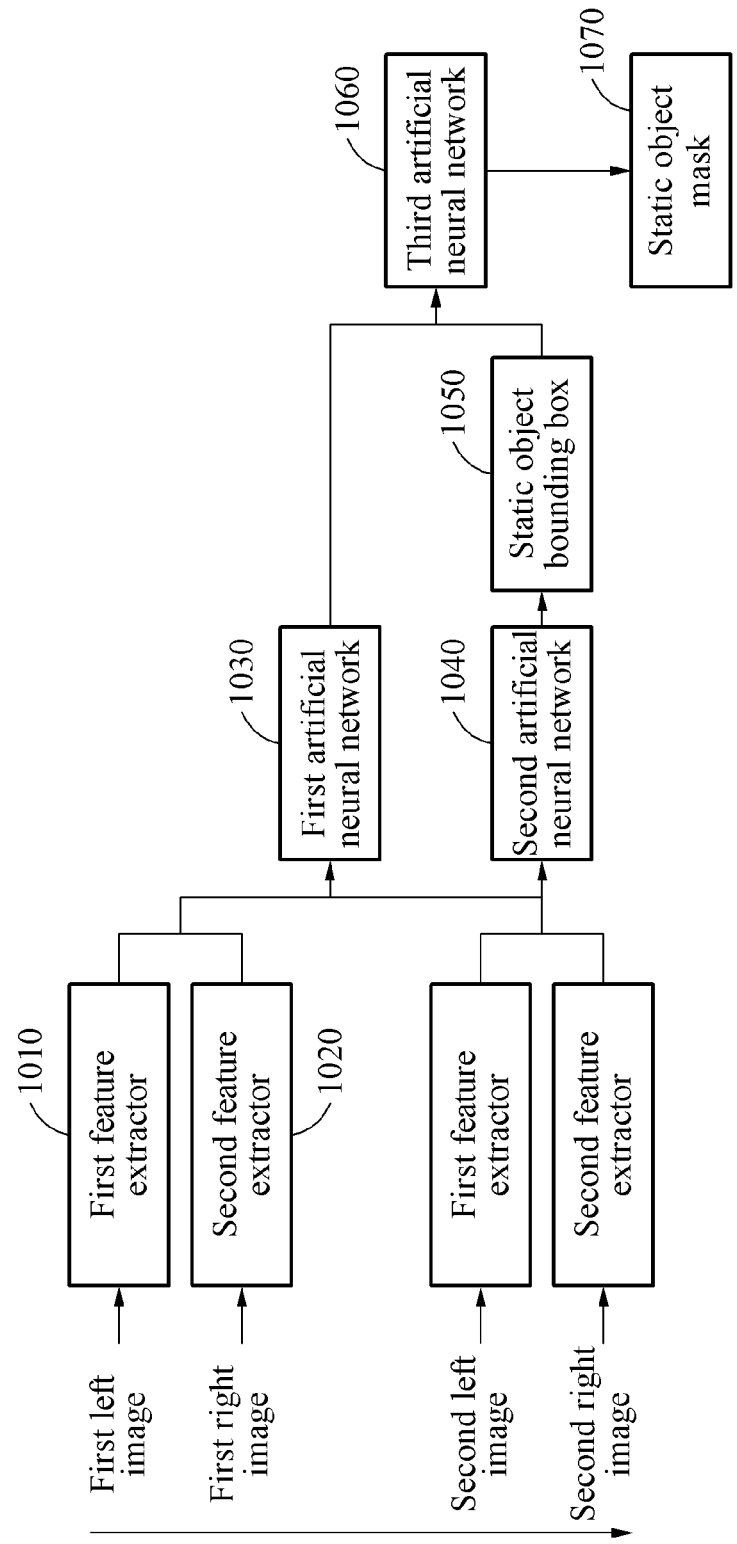
FIG. 10 illustrates an example of masking a static object.

FIG. 10 illustrates an example of masking a static object.

Referring to FIG. 10, a calculation apparatus calculates a feature map corresponding to a current frame by inputting the current frame into a feature extractor. The feature extractor is the feature extractor 810 of FIG. 8. The feature extractor includes a first feature extractor 1010 into which a left image is input and a second feature extractor 1020 into which a right image is input. The first feature extractor 1010 is a left CNN, and the second feature extractor 1020 is a right CNN. The left CNN and the right CNN share a weight.

The calculation apparatus inputs the current frame and a frame previous to the current frame (hereinafter, referred to as the previous frame) into the feature extractor. For example, the previous frame includes a first left image and a first right image, and the current frame includes a second left image and a second right image.

The calculation apparatus predicts optical flow information between the current frame and the previous frame based on a feature map of the current frame and a feature map of the previous frame, using an artificial neural network 1030 for optical flow direction (hereinafter, a first artificial neural network). The optical flow information refers to a visible motion pattern of an image object between two frames.

The calculation apparatus obtains a static object bounding box 1050 corresponding to the feature map of the current frame using an artificial neural network 1040 used for motion detection (hereinafter, a second artificial neural network). The second artificial neural network predicts object category attribute information based on the static object bounding box 1050. The second artificial neural network classifies objects included in the current frame into a plurality of categories. For example, the calculation apparatus classifies the objects as a vehicle, a human, an animal, a traffic sign, a desk and a chair, and a road.

In operation 1070, the calculation apparatus masks a static object region by inputting the static object bounding box 1050 and the optical flow information into an artificial neural network 1060 for non-static state prediction (hereinafter, a third artificial neural network). A static object is a binary image, and indicates state information of the objects included in the current frame. The state information of the objects includes information regarding whether the objects have non-static attributes or static attributes. The calculation apparatus extracts a non-static object region by masking the static object region in operation 1070.

Figure 11:
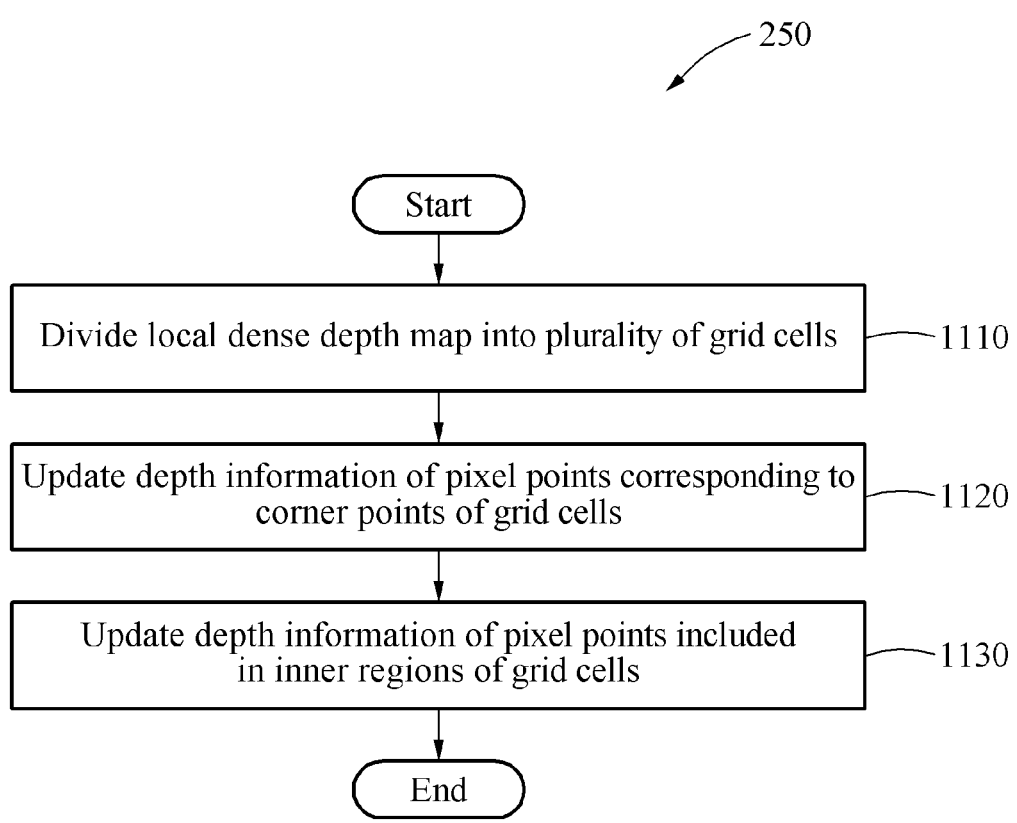
FIG. 11 illustrates an example of generating a global dense depth map.

FIG. 11 illustrates an example of generating a global dense depth map. Many of the operations shown in FIG. 11 may be performed in parallel or concurrently. One or more blocks of FIG. 11, and combinations of the blocks, can be implemented by special purpose hardware-based computer, and devices such as a processor, that perform the specified functions, or combinations of special purpose hardware and computer instructions. The calculation apparatus is implemented by one or more hardware modules. Referring to FIG. 11, operations 1110 through 1130 are performed by the calculation apparatus described with reference to FIGS. 1 through 10. In addition to the description of FIG. 11 below, the descriptions of FIGS. 1-10 is also applicable to FIG. 11 and are incorporated herein by reference. Thus, the above description may not be repeated here.

In operation 1110, the calculation apparatus divides a local dense depth map into a plurality of grid cells.

In operation 1120, the calculation apparatus updates depth information of pixel points corresponding to corner points of the grid cells based on a non-static object region-removed global sparse depth map. Pixel points included in a non-static object region may be noise points, and thus the calculation apparatus merges a depth map obtained by removing the non-static object region from the global sparse depth map with the local dense depth map.

In operation 1130, the calculation apparatus updates depth information of pixel points included in inner regions of the grid cells based on the non-static object region-removed global sparse depth map and the updated depth information of the pixel points corresponding to the corner points.

In an example, the calculation apparatus calculates the depth information of the pixel points corresponding to the corner points, and then interpolates depth information of remaining pixel points based on the depth information of the pixel points corresponding to the corner points. An example of updating the depth information of the pixel points will be described in detail with reference to FIG. 13.

Figure 12:
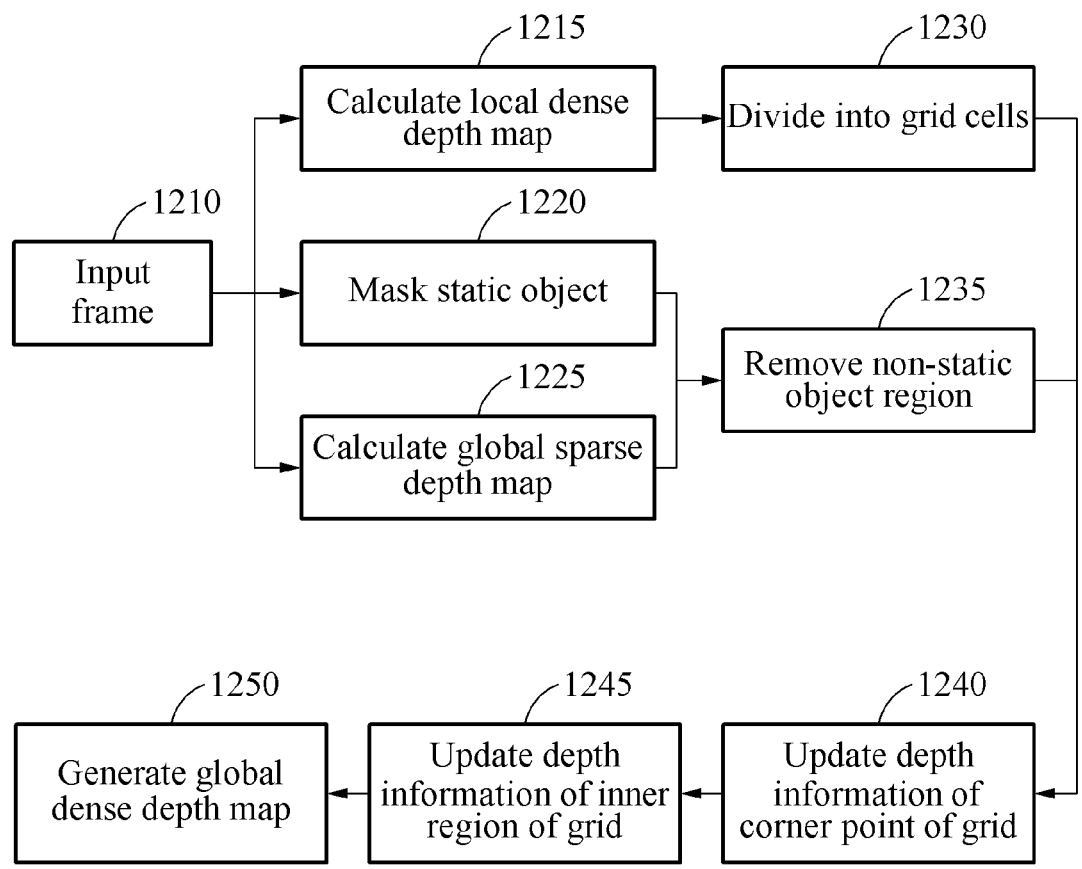
FIG. 12 illustrates an example of generating a global dense depth map.

FIG. 12 illustrates an example of generating a global dense depth map.

Referring to FIG. 12, in operation 1210, a calculation apparatus receives a frame. In operation 1215, the calculation apparatus calculates a local dense depth map corresponding to a current frame by inputting the current frame into an artificial neural network module. In operation 1220, the calculation apparatus masks a static object included in the current frame by inputting the current frame into the artificial neural network module. In operation 1225, the calculation apparatus calculates a global sparse depth map corresponding to the current frame based on the current frame and a key frame previous to the current frame.

In operation 1230, the calculation apparatus divides the local dense depth map into a plurality of grid cells. In operation 1235, the calculation apparatus removes a non-static object region from the global sparse depth map.

In operation 1240, the calculation apparatus updates depth information of pixel points corresponding to corner points of the grid cells based on the non-static object region-removed global sparse depth map.

In operation 1245, the calculation apparatus updates depth information of pixel points included in inner regions of the grid cells based on the non-static object region-removed global sparse depth map and the updated depth information of the pixel points corresponding to the corner points. In operation 1250, the calculation apparatus generates a high-accuracy, high-reliability global dense depth map.

Figure 13:
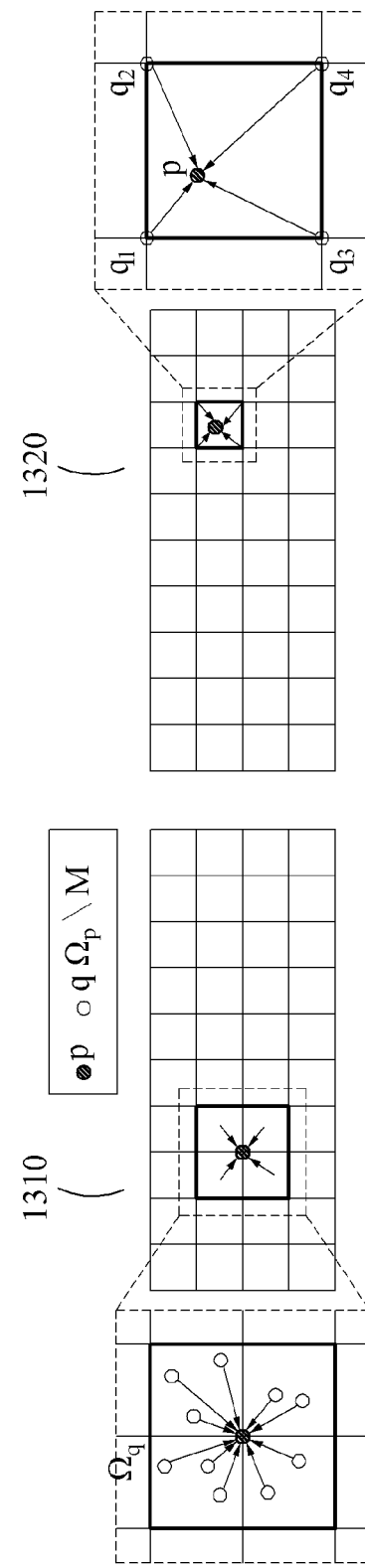
FIG. 13 illustrates an example of updating depth information of pixel points.

FIG. 13 illustrates an example of updating depth information of pixel points.

Referring to FIG. 13, when a pixel point is positioned on a corner point of a grid cell as in 1310, a calculation apparatus determines depth information $d_p$ of the pixel point of a global dense depth map based on Equation 2.

$$d_p = \frac{d_{l,p}}{N_p \times \sum_{q \in \Omega_p \setminus M} D(p,q)} \sum_{q \in \Omega_p \setminus M} \frac{d_{g,q} \times D(p,q)}{d_{l,q}} \quad \text{[Equation 2]}$$

When a pixel point is positioned inside a grid cell as in 1320, the calculation apparatus determines depth information $d_p$ of the pixel point on the global dense depth map based on Equation 3.

$$d_p = \frac{d_{l,p}}{4} \sum_{k \in [1,4]} \frac{d_{q_k} \times D(p, q_k)}{d_{l,q_k}} \quad \text{[Equation 3]}$$

In Equation 2 and Equation 3, $d_{l,p}$ denotes depth information of a pixel point p on the local dense depth map. $d_{g,q}$ denotes depth information of a pixel point q on the global sparse depth map. q denotes a pixel point in a set $\Omega_p\backslash M$. $\Omega_p$ denotes a set of pixel points in four grids adjacent to the pixel point p on the local dense depth map. $\Omega_p\backslash M$ denotes a set obtained after pixel points corresponding to a non-static object are removed from $\Omega_p$. $N_p$ denotes the quantity of pixel points with global sparse depth map coordinates, among the pixel points of $\Omega_p$. $D(p,q)$ denotes a distance between the pixel point p and the pixel point q. $d_{l,q}$ denotes depth information of the pixel point q on the global dense depth map. $d_{l,p}$ denotes depth information of a pixel point p' on the local dense depth map. $q_k$ denotes a vertex of a grid on which a pixel point q' is positioned. $d_{q_k}$ denotes depth information of $q_k$ on the global sparse depth map. $d_{l,qk}$ denotes depth information of the vertex $q_k$ on the local dense depth map. $D(p',q_k)$ denotes a distance between the pixel point p' and the vertex $q_k$.

Figure 14:
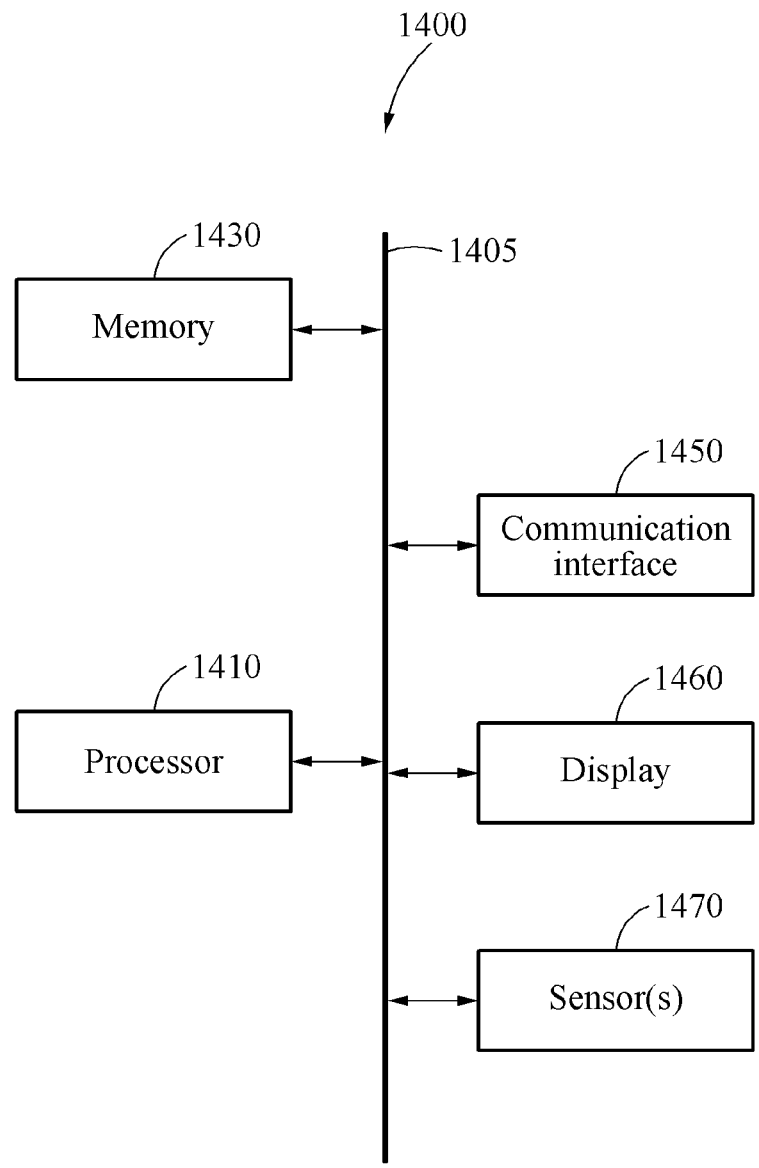
FIG. 14 illustrates an example of an apparatus for calculating a depth map.

FIG. 14 illustrates an example of an apparatus for calculating a depth map.

Referring to FIG. 14, a calculation apparatus 1400 includes a processor 1410, a memory 1430, and sensor(s) 1470. The calculation apparatus 1400 further includes a communication interface 1450 and/or a display device 1460. The processor 1410, the memory 1430, the communication interface 1450, the sensor(s) 1470 and the display device 1460 communicate with each other through a communication bus 1405.

The calculation apparatus 1400 is an electronic device which implements various AR applications in real time, such as, for example, an intelligent vehicle, an advanced driver assistance system (ADAS), a head-up display (HUD), an AR head-up display (HUD), an ARNR glass, an autonomous vehicle, an automatic or autonomous driving system, an intelligent vehicle, a smart phone, a mobile device, a computing device, for example, a server, a laptop, a notebook, a subnotebook, a netbook, an ultra-mobile PC (UMPC), a tablet personal computer (tablet), a phablet, a mobile internet device (MID), a personal digital assistant (PDA), an enterprise digital assistant (EDA), an ultra mobile personal computer (UMPC), a portable lab-top PC, a wearable smart device (such as, a pair of glasses, glasses-type device, a helmet, a device embedded in the cloths, or an eye glass display (EGD)), electronic product, for example, a robot, a digital camera, a digital video camera, a portable game console, a global positioning system (GPS) navigation, a personal navigation device, portable navigation device (PND), a handheld game console, a television (TV), a high definition television (HDTV), a smart TV, a smart appliance, a smart home device, or a security device for gate control, a walking assistance device, a robot, various Internet of Things (IoT) devices, or any other device capable of wireless communication or network communication consistent with that disclosed herein.

The sensor(s) 1470 are each an image sensor such as a camera. The camera acquires an input image. The camera is, for example, a red, green, and blue (RGB) camera or an RGB-depth (D) camera. The input image is an image input into the calculation apparatus 1400, for example, a live image or a moving picture. The input image is a mono image or a stereo image. The input image includes a plurality of frames. The input image is captured through the camera, or acquired from the outside of the calculation apparatus 1400.

The processor 1410 calculates a global sparse depth map corresponding to a current frame using a plurality of frames, calculates a local dense depth map corresponding to the current frame using the current frame, extracts a non-static object region from the current frame by masking a static object region, removes the non-static object region from the global sparse depth map, and generates a global dense depth map corresponding to the current frame by merging the non-static object region-removed global sparse depth map and the local dense depth map.

The processor 1410 calculates depth information corresponding to one or more pixel points included in the current frame, and calculates 3D coordinates of the pixel points based on the depth information.

The processor 1410 updates pose information of the camera corresponding to the current frame based on the global dense depth map, and updates the global sparse depth map based on the updated pose information of the camera.

The processor 1410 calculates first depth information corresponding to a key frame from among the plurality of frames, calculates second depth information corresponding to the current frame, estimates pose information of the camera corresponding to the current frame based on the first depth information and the second depth information, and calculates the global sparse depth map based on the second depth information and the pose information of the camera.

The processor 1410 performs stereo matching of a right image and a left image included in the current frame.

The processor 1410 obtains outputs of an artificial neural network corresponding to depth information of a plurality of pixel points by inputting the current frame including the plurality of pixel points into the artificial neural network, and calculates the local dense depth map based on the outputs.

The processor 1410 obtains outputs of an artificial neural network classified into a static object region and a non-static object region by inputting the current frame into the artificial neural network, and extracts the non-static object region based on the outputs.

The processor 1410 divides the local dense depth map into a plurality of grid cells, updates depth information of pixel points corresponding to corner points of the grid cells based on the non-static object region-removed global sparse depth map, and updates depth information of pixel points included in inner regions of the grid cells based on the non-static object region-removed global sparse depth map and the updated depth information of the pixel points corresponding to the corner points.

The processor 1410 calculates a right feature map corresponding to a right image and a left feature map corresponding to a left image by inputting the right image and the left image included in the current frame into a feature extracting module, obtains initial matching cost data of matching pixels between the left image and the right image based on the right feature map and the left feature map, predicts matching cost data by inputting the initial matching cost data into an artificial neural network, calculates respective depth information of the matching pixels based on the matching cost data, and calculates the local dense depth map based on the respective depth information.

The processor 1410 performs one or more of the method described with reference to FIGS. 1 through 13 or an algorithm corresponding to the method. The processor 1410 executes a program, and controls the calculation apparatus 1400. Program codes to be executed by the processor 1410 are stored in the memory 1430.

In an example, the processor 1410 is a data processing device implemented by hardware including a circuit having a physical structure to perform desired operations. For example, the desired operations include instructions or codes included in a program. For example, the hardware-implemented data processing device includes a microprocessor, a central processing unit (CPU), a processor core, a multi-core processor, a reconfigurable processor, a multicore processor, a multiprocessor, an application-specific integrated circuit (ASIC), and a field programmable gate array (FPGA), a graphics processor unit (GPU), or any other type of multi- or single-processor configuration. Further details regarding the processor 1410 is provided below.

The memory 1430 stores the input image and/or the plurality of frames. The memory 1430 stores the pose information of the camera estimated by the processor 1410 with respect to the input image, the depth maps calculated by the processor 1410, and/or a 3D image reconstructed by the processor 1410 using the depth maps.

Further, the memory 1430 stores a variety of information generated during the process performed by the processor 1410. In addition, the memory 1430 stores a variety of data and programs. The memory 1430 includes a volatile memory or a non-volatile memory. The memory 1430 includes a large-capacity storage medium such as a hard disk to store the variety of data. Further details regarding the memory 1430 is provided below.

In an example, the calculation apparatus 1400 may receive an input image captured outside of the calculation apparatus 1400 through the communication interface 1450. In this example, the communication interface 1450 may also receive pose information such as rotation information and translation information of a capturing device used to capture the input image, and position information of the capturing device, in addition to the input image.

The display device 1460 displays the 3D image reconstructed based on the depth maps calculated by the processor 1410. The display device 1460 are not limited to the example described above, and any other displays, such as, for example, computer monitor and eye glass display (EGD) that are operatively connected to the calculation apparatus 1400 may be used without departing from the spirit and scope of the illustrative examples described. In an example, the display device 1460 is a physical structure that includes one or more hardware components that provide the ability to render a user interface, render a display, and/or receive user input.

The SLAM module 320, the pose estimator 321, the global sparse depth map calculator 323, the local dense depth map calculator 331, the masker 333, the depth map merger 340, the non-static object region remover 341, the global dense depth map generator 343, the feature extractor 810, the first feature extractor 811, the second feature extractor 812, the initial cost volume module 820, the feature extractor 1010, the second feature extractor 1020, the calculation apparatus 1400, and other apparatuses, units, modules, devices, and other components described herein with respect to FIGS. 1-14 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-14 that perform the operations described in this application are performed by computing hardware, for example, by one or more processors or computers, implemented as described above executing instructions or software to perform the operations described in this application that are performed by the methods.

For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In an example, the instructions or software includes at least one of an applet, a dynamic link library (DLL), middleware, firmware, a device driver, an application program storing the depth map calculating method. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, card type memory such as multimedia card, secure digital (SD) card, or extreme digital (XD) card, magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A depth map calculating method, comprising:
   calculating a global sparse depth map corresponding to a current frame using frames including the current frame;
   calculating a local dense depth map corresponding to the current frame using the current frame;
   extracting a non-static object region from the current frame by masking a static object region;
   removing the non-static object region from the global sparse depth map;
   generating a global dense depth map corresponding to the current frame by merging the non-static object region-removed global sparse depth map and the local dense depth map; and
   updating pose information of a camera corresponding to the current frame based on the global dense depth map.

2. The depth map calculating method of claim 1, wherein the calculating of the global sparse depth map comprises:
   calculating depth information corresponding to one or more pixel points in the current frame;
   estimating pose information of a camera corresponding to the current frame; and
   calculating three-dimensional (3D) coordinates of the one or more pixel points based on the depth information and the pose information of the camera.

3. The depth map calculating method of claim 1, further comprising:
   updating the global sparse depth map based on the updated pose information of the camera.

4. The depth map calculating method of claim 1, wherein the calculating of the global sparse depth map comprises:
   calculating first depth information corresponding to a key frame of a timepoint previous to the current frame, from among the frames;
   calculating second depth information corresponding to the current frame;
   estimating pose information of a camera corresponding to the current frame based on the first depth information and the second depth information; and
   calculating the global sparse depth map based on the second depth information and the pose information of the camera.

5. The depth map calculating method of claim 4, wherein the calculating of the second depth information comprises performing stereo matching of a right image and a left image in the current frame.

6. The depth map calculating method of claim 4, wherein the pose information of the camera comprises any one or any combination one of rotation information and translation information changing, in response to the camera moving from a first location to a second location.

7. The depth map calculating method of claim 1, wherein the calculating of the local dense depth map comprises:
   obtaining outputs of an artificial neural network corresponding to depth information of pixel points by inputting the current frame including the pixel points into the artificial neural network; and
   calculating the local dense depth map based on the outputs.

8. The depth map calculating method of claim 1, wherein the generating comprises:
   dividing the local dense depth map into a grid of cells;
   updating depth information of pixel points corresponding to corner points of the grid cells based on the non-static object region-removed global sparse depth map; and
   updating depth information of pixel points in inner regions of the grid cells based on the non-static object region-removed global sparse depth map and the updated depth information of the pixel points corresponding to the corner points.

9. The depth map calculating method of claim 1, wherein the calculating of the local dense depth map comprises:
calculating a right feature map corresponding to a right image and a left feature map corresponding to a left image by inputting the right image and the left image in the current frame into a feature extractor;
obtaining initial matching cost data of matching pixels between the left image and the right image based on the right feature map and the left feature map;
predicting matching cost data by inputting the initial matching cost data into an artificial neural network;
calculating respective depth information of the matching pixels based on the matching cost data; and
calculating the local dense depth map based on the respective depth information.

10. The depth map calculating method of claim 9, wherein the feature extracting module comprises a left convolutional neural network (CNN) into which the left image is input and a right CNN into which the right image is input, and
the left CNN and the right CNN share a weight.

11. The depth map calculating method of claim 9, wherein the obtaining of the initial matching cost data comprises obtaining the initial matching cost data by connecting the right feature map and the left feature map.

12. The depth map calculating method of claim 9, wherein the predicting of the matching cost data comprises predicting the matching cost data based on an hourglass artificial neural network and the initial matching cost data.

13. The depth map calculating method of claim 9, wherein the calculating of the depth information comprises:
performing a spatial convolution operation with respect to the matching cost data using a CNN;
estimating a disparity of matching pixels between the left image and the right image based on a result of performing the spatial convolution operation; and
calculating the depth information based on the disparity.

14. The depth map calculating method of claim 13, wherein the performing of the spatial convolution operation comprises:
obtaining matching cost layers by performing a division with respect to the matching cost data based on a direction set for the matching cost data; and
performing a convolution operation sequentially with respect to the matching cost layers based on the direction.

15. The depth map calculating method of claim 14, wherein the performing of the convolution operation sequentially comprises performing the convolution operation after accumulating a convolution result of a matching cost layer previous to a matching cost layer, when performing the convolution operation with respect to the matching cost layer.

16. The depth map calculating method of claim 13, wherein the estimating of the disparity of the matching pixels comprises:
obtaining a disparity probability distribution of matching pixels between the left image and the right image based on the result of performing the spatial convolution operation and a softmax function; and
estimating the disparity based on the disparity probability distribution.

17. The depth map calculating method of claim 1, wherein the extracting comprises:
calculating a feature map corresponding to the current frame by inputting the current frame into a feature extracting module;
obtaining category attribute information of objects in the current frame based on the feature map; and
obtaining state information of the objects included in the current frame based on the category attribute information.

18. The depth map calculating method of claim 17, wherein the obtaining of the state information comprises:
determining optical flow information between the current frame and a frame previous to the current frame; and
obtaining the state information based on the optical flow information and the category attribute information.

19. A non-transitory computer-readable storage medium storing instructions that, when executed by a processor, cause the processor to perform the depth map calculating method of claim 1.

20. The depth map calculating method of claim 1, wherein the extracting comprises:
obtaining outputs of an artificial neural network classified into a static object region and a non-static object region by inputting the current frame into the artificial neural network; and
extracting the non-static object region based on the outputs.

21. A depth map calculating method, comprising:
calculating a global sparse depth map corresponding to a current frame using frames including the current frame;
calculating a local dense depth map corresponding to the current frame using the current frame;
extracting a non-static object region from the current frame by masking a static object region;
removing the non-static object region from the global sparse depth map; and
generating a global dense depth map corresponding to the current frame by merging the non-static object region-removed global sparse depth map and the local dense depth map,
wherein the extracting comprises:
obtaining outputs of an artificial neural network classified into a static object region and a non-static object region by inputting the current frame into the artificial neural network; and
extracting the non-static object region based on the outputs.

22. A depth map calculating apparatus, comprising:
a camera configured to acquire frames including a current frame; and
a processor configured to
calculate a global sparse depth map corresponding to the current frame using the frames,
calculate a local dense depth map corresponding to the current frame using the current frame,
extract a non-static object region from the current frame by masking a static object region,
remove the non-static object region from the global sparse depth map,
generate a global dense depth map corresponding to the current frame by merging the non-static object region-removed global sparse depth map and the local dense depth map, and
update pose information of a camera corresponding to the current frame based on the global dense depth map.

23. The depth map calculating apparatus of claim 22, wherein the processor is further configured to calculate depth information corresponding to one or more pixel points included in the current frame, and to calculate three-dimensional (3D) coordinates of the one or more pixel points based on the depth information.

24. The depth map calculating apparatus of claim 23, wherein the processor is further configured to update pose information of a camera corresponding to the current frame based on the global dense depth map.

25. The depth map calculating apparatus of claim 24, wherein the processor is further configured to update the global sparse depth map based on the updated pose information of the camera.

26. The depth map calculating apparatus of claim 25, wherein the processor is further configured to perform stereo matching of a right image and a left image in the current frame.

27. The depth map calculating apparatus of claim 22, wherein the processor is further configured to:
calculate first depth information corresponding to a key frame from among the frames,
calculate second depth information corresponding to the current frame,
estimate pose information of a camera corresponding to the current frame based on the first depth information and the second depth information, and
calculate the global sparse depth map based on the second depth information and the pose information of the camera.

28. The depth map calculating apparatus of claim 22, wherein the processor is further configured to obtain outputs of an artificial neural network corresponding to depth information of pixel points by inputting the current frame including the pixel points into the artificial neural network, and to calculate the local dense depth map based on the outputs.

29. The depth map calculating apparatus of claim 22, wherein the processor is further configured to obtain outputs of an artificial neural network classified into a static object region and a non-static object region by inputting the current frame into the artificial neural network, and to extract the non-static object region based on the outputs.

30. The depth map calculating apparatus of claim 22, wherein the processor is further configured to:
divide the local dense depth map into a grid of cells,
update depth information of pixel points corresponding to corner points of the grid cells based on the non-static object region-removed global sparse depth map, and
update depth information of pixel points in inner regions of the grid cells based on the non-static object region-removed global sparse depth map and the updated depth information of the pixel points corresponding to the corner points.

31. The depth map calculating apparatus of claim 22, wherein the processor is further configured to
calculate a right feature map corresponding to a right image and a left feature map corresponding to a left image by inputting the right image and the left image in the current frame into a feature extractor,
obtain initial matching cost data of matching pixels between the left image and the right image based on the right feature map and the left feature map,
predict matching cost data by inputting the initial matching cost data into an artificial neural network,
calculate respective depth information of the matching pixels based on the matching cost data, and
calculate the local dense depth map based on the respective depth information.

* * * * *